US012745782B2

(12) United States Patent
Toho et al.

(10) Patent No.: US 12,745,782 B2
(45) Date of Patent: Sep. 29, 2026

(54) OIL/FAT COMPOSITION

(71) Applicant: KAO CORPORATION, Tokyo (JP)

(72) Inventors: Kazuya Toho, Sumida-ku (JP); Katsuyoshi Saito, Sumida-ku (JP)

(73) Assignee: KAO CORPORATION, Tokyo (JP)

( * ) Notice: Subject to any disclaimer, the term of this patent is extended or adjusted under 35 U.S.C. 154(b) by 275 days.

(21) Appl. No.: 18/551,641

(22) PCT Filed: Mar. 31, 2022

(86) PCT No.: PCT/JP2022/016491

§ 371 (c)(1),
(2) Date: Sep. 21, 2023

(87) PCT Pub. No.: WO2022/211017

PCT Pub. Date: Oct. 6, 2022

(65) Prior Publication Data

US 2024/0164398 A1 May 23, 2024

(30) Foreign Application Priority Data

Apr. 1, 2021 (JP) ................................ 2021-062788

(51) Int. Cl.
*A23D 9/007* (2006.01)

(52) U.S. Cl.
CPC .................................. *A23D 9/007* (2013.01)

(58) Field of Classification Search
CPC ...................................................... A23D 9/007
See application file for complete search history.

(56) References Cited

U.S. PATENT DOCUMENTS

| | | | | |
|---|---|---|---|---|
| 2002/0142089 | A1 | 10/2002 | Koike et al. | |
| 2003/0054082 | A1 | 3/2003 | Koike et al. | |
| 2003/0072858 | A1 | 4/2003 | Koike et al. | |
| 2010/0093856 | A1 * | 4/2010 | Deckelbaum | A61K 9/0053 514/547 |
| 2014/0220223 | A1 * | 8/2014 | Homma | A23D 9/007 426/607 |
| 2020/0085774 | A1 | 3/2020 | Nyheim et al. | |

FOREIGN PATENT DOCUMENTS

| | | | |
|---|---|---|---|
| CN | 103930104 | A | 7/2014 |
| CN | 106053677 | A | 10/2016 |
| CN | 110141564 | A | 8/2019 |
| CN | 112513235 | A | 3/2021 |
| JP | 4-300825 | A | 10/1992 |
| JP | 8-89265 | A | 4/1996 |
| JP | 8-214892 | A | 8/1996 |
| JP | 2001-40386 | A | 2/2001 |
| JP | 2001-64672 | A | 3/2001 |
| JP | 2002-322490 | A | 11/2002 |
| JP | 2004-208539 | A | 7/2004 |
| JP | 2004-222594 | A | 8/2004 |
| JP | 2004-222595 | A | 8/2004 |
| JP | 2020-503388 | A | 1/2020 |
| WO | WO 2007/132888 | A1 | 11/2007 |
| WO | WO 2008/133573 | A1 | 11/2008 |
| WO | WO 2018/211001 | A1 | 11/2018 |

OTHER PUBLICATIONS

Castro-Gómez et al., "Comprehensive Study of the Lipid Classes of Krill Oil by Fractionation and Identification of Triacylglycerols, Diacylglycerols, and Phospholipid Molecular Species by Using UPLC/QToF-MS", Food Analytical Methods, vol. 8, Mar. 26, 2015, pp. 2568-2580, XP035550595.

Gudmundsdottir et al., "Synthesis of reversed structured triacylglycerols possessing EPA and DHA at their terminal positions", Tetrahedron, vol. 71, Sep. 15, 2015, pp. 8544-8550, XP029288635.

Extended European Search Report issued Mar. 11, 2025 in European Patent Application No. 22781227.8, 10 pages.

International Search Report issued Jun. 21, 2022 in PCT/JP2022/016491 filed on Mar. 31, 2022, 3 pages.

Akanbi et al., "Pancreatic lipase selectively hydrolyses DPA over EPA and DHA due to location of double bonds in the fatty acid rather than regioselectivity", Food Chemistry, 160, (2014) pp. 61-66.

Eguchi et al., "Saturated Fatty Acid and TLR Signaling Link β Cell Dysfunction and Islet Inflammation", Cell Metabolism, 2012, 15, pp. 518-533.

* cited by examiner

*Primary Examiner* — Erik Kashnikow
*Assistant Examiner* — Assaf Zilbering
(74) *Attorney, Agent, or Firm* — Oblon, McClelland, Maier & Neustadt, L.L.P.

(57) ABSTRACT

A fat or oil composition, including a fat or oil. A content of diacylglycerols in the fat or oil is from 60 mass % to 100 mass %, a content of eicosapentaenoic acid in constituent fatty acids of the diacylglycerols is from 15 mass % to 99 mass %, and a content (X) of the diacylglycerols and a content (Y) of the eicosapentaenoic acid satisfy a relationship of the following expression (1):

$$X \times 0.6 + Y > 60 \quad (1)$$

where X represents the content (mass %) of the diacylglycerols in the fat or oil, and Y represents the content (mass %) of the eicosapentaenoic acid in the constituent fatty acids of the diacylglycerols.

20 Claims, No Drawings

OIL/FAT COMPOSITION

CROSS REFERENCE TO RELATED APPLICATIONS

This application is a National Stage entry under 35 U.S.C. § 371 of PCT/JP2022/016491, filed on Mar. 31, 2022, and claims priority to Japanese Patent Application No. 2021-062788, filed on Apr. 1, 2021. The entire contents of both are incorporated herein by reference.

FIELD OF THE INVENTION

The present invention relates to a fat or oil composition.

BACKGROUND OF THE INVENTION

Eicosapentaenoic acid (C20:5, EPA) is a linear highly unsaturated fatty acid having 20 carbon atoms and having 5 double bonds. Eicosapentaenoic acid is said to be a precursor of prostaglandin and thromboxane $A_3$, which are physiologically active substances, and is present as acylglycerols in fish oil and whale oil together with docosahexaenoic acid (C22:6, DHA).

As physiological actions of eicosapentaenoic acid, there have been reported an anti-inflammatory action, a platelet aggregation inhibition action, or the like. In addition, an ameliorating action of eicosapentaenoic acid on cancer cachexia has been reported. For example, there is a proposal of a composition containing a fatty acid oil mixture including at least 50 weight % of at least one fatty acid selected from EPA and DHA based on a weight of the fatty acid oil mixture, in which at least 15 weight % of the fatty acids in the fatty acid oil mixture are in the form of monoacylglyceride and it is for therapeutic and/or prophylactic treatment of cachexia (Patent Document 1).

In general, lipids ingested as a diet are digested and absorbed in the small intestine. The lipids are emulsified by bile acid first. After that, acylglycerols are subjected to hydrolysis by pancreatic lipase secreted from the pancreas to free their fatty acids. The freed fatty acids are absorbed by small intestine mucosal epithelial cells, and then are resynthesized into phospholipids, triacylglycerols, or the like to be transported in blood, or to show physiological actions in the lower digestive tract.

Accordingly, freeing of eicosapentaenoic acid from a fat or oil through hydrolysis by pancreatic lipase is conceived to be important for acquiring the physiological actions of the fatty acid. Meanwhile, there is a report that a hydrolytic action of pancreatic lipase on an eicosapentaenoic acid ester is weak, and hence eicosapentaenoic acid in a fat or oil is hardly hydrolyzed (Non Patent Document 1). Non Patent Document 1 also teaches that saturated fatty acids having 14, 16, and 18 carbon atoms are fatty acids that are vulnerable to hydrolysis by pancreatic lipase as compared to eicosapentaenoic acid. Accordingly, more saturated fatty acids are freed during the hydrolysis of a fat or oil by pancreatic lipase in a digestive process. It is known that the saturated fatty acids, when in a free state, can raise a chronic disease such as pancreatic dysfunction due to an inflammatory action (Non Patent Document 2).

[Patent Document 1] JP-A-2020-503388
[Non Patent Document 1] Food Chem., 2014 160: 61-66
[Non Patent Document 2] Cell Metabolism, 2012 15: 518-533

SUMMARY OF THE INVENTION

The present invention provides a fat or oil composition, comprising a fat or oil, wherein a content of diacylglycerols in the fat or oil is from 60 mass % to 100 mass %, a content of eicosapentaenoic acid in constituent fatty acids of the diacylglycerols is from 15 mass % to 99 mass %, and a content (X) of the diacylglycerols and a content (Y) of the eicosapentaenoic acid satisfy a relationship of the following expression (1):

$$X\times0.6+Y>60 \quad (1)$$

where X represents the content (mass %) of the diacylglycerols in the fat or oil, and Y represents the content (mass %) of the eicosapentaenoic acid in the constituent fatty acids of the diacylglycerols.

DETAILED DESCRIPTION OF THE INVENTION

The present invention relates to provide such a fat or oil composition, comprising a fat or oil, in which eicosapentaenoic acid in the fat or oil is vulnerable to hydrolysis by pancreatic lipase, and saturated fatty acids are hardly hydrolyzed thereby.

The present inventors investigated the degradation/release behavior of fatty acids in a fat or oil through use of a digestion model test system taking digestion in the small intestine into consideration. As a result, they found that, when predetermined amounts of diacylglycerols and eicosapentaenoic acid were incorporated into the fat or oil and into the diacylglycerols, respectively, and when diacylglycerols and eicosapentaenoic acid satisfy a certain relationship, eicosapentaenoic acid in the fat or oil was vulnerable to hydrolysis, and the hydrolysis of the saturated fatty acids was suppressed, at the time of hydrolysis by pancreatic lipase.

According to the present invention, it is possible to provide such a fat or oil composition that eicosapentaenoic acid in a fat or oil is vulnerable to hydrolysis by pancreatic lipase, and saturated fatty acids are hardly hydrolyzed thereby. The fat or oil composition of the present invention has more eicosapentaenoic acid freed from the fat or oil and less saturated fatty acids freed therefrom during a digestive process. Thus, it is possible to allow the physiological actions of eicosapentaenoic acid to be exerted in vivo while avoiding the influences of the saturated fatty acids.

The fat or oil composition of the present invention contains a fat or oil, in which the content of diacylglycerols in the fat or oil is from 60 mass % to 100 mass %, the content of eicosapentaenoic acid constituent fatty acids of the diacylglycerols is from 15 mass % to 99 mass %, and the content (X) of the diacylglycerols and the content (Y) of eicosapentaenoic acid satisfy a relationship of the following expression (1):

$$X\times0.6+Y>60 \quad (1)$$

where X represents the content (mass %) of the diacylglycerols in the fat or oil, and Y represents the content (mass %) of eicosapentaenoic acid in the constituent fatty acids of the diacylglycerols.

In the present invention, the content of the fat or oil in the fat or oil composition is preferably 90 mass % (hereinafter simply "%") or more, more preferably 95% or more, and is preferably 100% or less, more preferably 99.9% or less, from the standpoint of usability.

The content of the fat or oil in the fat or oil composition is preferably from 90% to 100%, more preferably from 95% to 99.9%.

In the present invention, the fat or oil contains any one or more kinds of monoacylglycerols, diacylglycerols, and triacylglycerols. The kind of the fat or oil is not particularly limited, and may be any fat or oil that can be used as an edible fat or oil.

In the present invention, the content of the diacylglycerols in the fat or oil is from 60% to 100%. The content of the diacylglycerols in the fat or oil is 60% or more, preferably 70% or more, more preferably 80% or more, from the standpoint of suppressing the saturated fatty acids in the fat or oil from being hydrolyzed in a large amount at the time of hydrolysis by pancreatic lipase, and the standpoint of physiological effects, and is 100% or less, preferably 99.5% or less, more preferably 98% or less, more preferably 95% or less, even more preferably 90% or less, from the standpoint of the industrial productivity of the fat or oil.

The content of the diacylglycerols in the fat or oil is from 60% to 100%, preferably from 60% to 99.5%, more preferably from 60% to 98%, more preferably from 70% to 95%, more preferably from 70% to 90%, even more preferably from 80% to 90%.

In the present invention, the content of eicosapentaenoic acid in the constituent fatty acids of the diacylglycerols is from 15% to 99%. The content of eicosapentaenoic acid in the constituent fatty acids of the diacylglycerols is 15% or more, preferably 18% or more, more preferably 20% or more, more preferably 25% or more, more preferably 30% or more, more preferably 40% or more, even more preferably 45% or more, from the standpoint of suppressing the saturated fatty acids in the fat or oil from being hydrolyzed in a large amount at the time of hydrolysis by pancreatic lipase, and the standpoint of physiological effects, and is 99% or less, preferably 98% or less, more preferably 95% or less, from the standpoint of oxidative stability.

The content of eicosapentaenoic acid in the constituent fatty acids of the diacylglycerols is from 15% to 99%, preferably from 18% to 99%, more preferably from 20% to 99%, more preferably from 25% to 99%, more preferably from 30% to 99%, more preferably from 40% to 98%, more preferably from 45% to 98%, even more preferably from 45% to 95%.

The amount of a fatty acid as used herein refers to an amount obtained by converting the fatty acid to a free fatty acid.

The constituent fatty acids of the diacylglycerols other than eicosapentaenoic acid are not particularly limited, and may be any of saturated fatty acids and unsaturated fatty acids.

From the standpoints of the taste and flavor and industrial productivity of the fat or oil, the content of the unsaturated fatty acids in the constituent fatty acids of the diacylglycerols is preferably from 60% to 100%, more preferably from 70% to 99.8%, even more preferably from 80% to 99.5%. The carbon numbers of the unsaturated fatty acids are preferably from 14 to 24, more preferably from 16 to 22, from the standpoint of physiological effects.

In particular, the content of linoleic acid (C18:2) in the constituent fatty acids of the diacylglycerols is preferably 0.4% or more, more preferably 0.5% or more, more preferably 1% or more, even more preferably 1.5% or more, and is preferably 30% or less, more preferably 20% or less, even more preferably 10% or less, from the standpoint of the industrial productivity of the fat or oil.

In addition, the content of oleic acid (C18:1) in the constituent fatty acids of the diacylglycerols is preferably 1% or more, more preferably 5% or more, more preferably 7% or more, even more preferably 10% or more, and is preferably 30% or less, more preferably 25% or less, even more preferably 20% or less, from the standpoint of the industrial productivity of the fat or oil.

In addition, the content of docosahexaenoic acid (C22:6) in the constituent fatty acids of the diacylglycerols is preferably 0.3% or more, more preferably 3% or more, more preferably 4% or more, even more preferably 5% or more, and is preferably 40% or less, more preferably 30% or less, more preferably 25% or less, even more preferably 20% or less, from the standpoint of the industrial productivity of the fat or oil.

The total content of the saturated fatty acids in the constituent fatty acids of the diacylglycerols is preferably 15% or less, more preferably 12% or less, even more preferably 10% or less, and is preferably 0.5% or more, from the standpoints of appearance, physiological effects, and the industrial productivity of the fat or oil.

The total content of the saturated fatty acids in the constituent fatty acids of the diacylglycerols is preferably from 0% to 15%, more preferably from 0.5% to 12%, even more preferably 0.5% to 10%.

Herein, the carbon numbers of the saturated fatty acids are preferably from 14 to 24, more preferably from 16 to 22.

In the present invention, the content (X) of the diacylglycerols and the content (Y) of eicosapentaenoic acid satisfy the following expression (1):

$$X\times0.6+Y>60 \quad (1)$$

where, in the expression (1), X represents the content (mass %) of the diacylglycerols in the fat or oil, and Y represents the content (mass %) of eicosapentaenoic acid in the constituent fatty acids of the diacylglycerols.

When predetermined amounts of diacylglycerols and eicosapentaenoic acid are incorporated into the fat or oil and into the diacylglycerols, respectively, and besides, the expression (1) is satisfied, eicosapentaenoic acid in the fat or oil is vulnerable to hydrolysis by pancreatic lipase, whereas the hydrolysis of the saturated fatty acids thereby is suppressed, resulting in more eicosapentaenoic acid freed from the fat or oil, and less saturated fatty acids freed therefrom.

In the present invention, from the standpoint of suppressing the saturated fatty acids in the fat or oil from being hydrolyzed in a large amount at the time of hydrolysis by pancreatic lipase, and the standpoint of physiological effects, the content (X) of the diacylglycerols and the content (Y) of eicosapentaenoic acid preferably satisfy a relationship of the following expression (2), more preferably satisfy a relationship of the following expression (3), more preferably satisfy a relationship of the following expression (4), more preferably satisfy a relationship of the following expression (5), and even more preferably satisfy a relationship of the following expression (6):

$$X\times0.6+Y>62 \quad (2)$$

$$X\times0.6+Y>65 \quad (3)$$

$$X\times0.6+Y>70 \quad (4)$$

$$X\times0.6+Y>75 \quad (5)$$

$$X\times0.6+Y>80 \quad (6)$$

where X and Y each have the same meaning as in the foregoing.

The fat or oil of the present invention may comprise triacylglycerols. The content of the triacylglycerols in the fat or oil is preferably 1% or more, more preferably 2% or more, more preferably 5% or more, even more preferably 10% or more, and is preferably 35% or less, more preferably 30% or less, more preferably 25% or less, even more preferably 20% or less, from the standpoint of the industrial productivity of the fat or oil.

The content of the triacylglycerols in the fat or oil is preferably from 1% to 35%, more preferably from 2% to 30%, more preferably from 5% to 25%, even more preferably from 10% to 20%.

The content of monoacylglycerols in the fat or oil is preferably 15% or less, more preferably 10% or less, more preferably 5% or less, more preferably 3% or less, more preferably 2% or less, even more preferably 1.5% or less, and is preferably more than 0%, more preferably 0.1% or more, from the standpoints of taste and flavor, the industrial productivity of the fat or oil, and oxidative stability. The content of the monoacylglycerols in the fat or oil may be 0%.

The content of the monoacylglycerols in the fat or oil is preferably from 0% to 15%, more preferably from 0% to 10%, more preferably from 0% to 5%, more preferably from 0.1% to 3%, more preferably from 0.1% to 2%, even more preferably from 0.1% to 1.5%.

The content of a free fatty acid or a salt thereof in the fat or oil is preferably 3% or less, more preferably 2% or less, even more preferably 1% or less, and is preferably more than 0%, from the standpoints of taste and flavor and oxidation stability. The content of the free fatty acid or the salt thereof in the fat or oil may be 0%.

In the present invention, the constituent fatty acids of the fat or oil may be identical in composition to, or different therein from, the above-mentioned constituent fatty acids of the diacylglycerols, but is preferably identical.

The content of eicosapentaenoic acid in the constituent fatty acids of the fat or oil is preferably from 15% to 99%, more preferably from 15% to 98%, more preferably from 18% to 98%, more preferably from 20% to 98%, more preferably from 25% to 97%, more preferably from 30% to 95%, more preferably from 40% to 95%, more preferably from 45% to 95%, even more preferably from 45% to 90%.

The content of unsaturated fatty acids in the constituent fatty acids of the fat or oil is preferably from 60% to 100%, more preferably from 70% to 99.8%, even more preferably from 80% to 99.5%.

In addition, the total content of saturated fatty acids in the constituent fatty acids of the fat or oil is preferably 15% or less, more preferably 12% or less, even more preferably 10% or less, and is preferably 0.5% or more, from the standpoints of appearance, physiological effects, and the industrial productivity of the fat or oil.

The total content of the saturated fatty acids in the constituent fatty acids of the fat or oil is preferably from 0% to 15%, more preferably from 0.5% to 12%, even more preferably 0.5% to 10%.

The fat or oil composition of the present invention preferably comprises an antioxidant from the standpoint of oxidative stability.

The content of the antioxidant in the fat or oil composition is preferably 0.005% or more and 3% or less, more preferably 0.04% or more and 2% or less, more preferably 0.08% or more and 1% or less, even more preferably 0.2% or more and 0.8% or less, from the standpoints of taste and flavor, oxidative stability, suppression of coloration, or the like.

The antioxidant is not particularly limited as long as the antioxidant is used for a food, but at least one kind selected from the group consisting of a natural antioxidant, lecithin, tocopherol, ascorbyl palmitate, ascorbyl stearate, dibutylhydroxytoluene (BHT), and butylhydroxyanisole (BHA) is preferred.

The fat or oil composition of the present invention may be prepared from a diacylglycerol-containing fat or oil containing eicosapentaenoic acid in its constituent fatty acids. As required, a general edible fat or oil may be blended.

The diacylglycerol-containing fat or oil containing eicosapentaenoic acid in its constituent fatty acids may be obtained, for example, through: an esterification reaction between fatty acids derived from a fat or oil, and glycerin; or a transesterification reaction (glycerolysis) between a fat or oil, and glycerin.

The esterification reaction and the glycerolysis reaction are broadly classified into: a chemical method involving using a chemical catalyst, such as an alkali metal or an alloy thereof, an oxide or hydroxide of an alkali metal or an alkaline earth metal, or an alkoxide of an alkali metal or an alkaline earth metal; and an enzymatic method involving using an enzyme such as a lipase.

Of those, an esterification reaction between fractionated fatty acids derived from a fat or oil, which are described later, and glycerin is preferred from the standpoint of controlling fatty acid composition.

In the present invention, the fat or oil (edible fat or oil) may be any of a plant-derived fat or oil and an animal-derived fat or oil. Examples thereof may include fat or oil including: plant-derived fat or oil, such as soybean oil, rapeseed oil, safflower oil, rice oil, corn oil, sunflower oil, cotton seed oil, olive oil, sesame oil, peanut oil, Job's tears seed oil, wheat germ oil, Japanese basil oil, linseed oil (flaxseed oil), perilla oil, chia seed oil, sacha inchi oil, walnut oil, kiwi seed oil, salvia seed oil, grape seed oil, macadamia nut oil, hazelnut oil, pumpkin seed oil, camellia oil, tea seed oil, borage oil, palm oil, palm olein, palm stearin, coconut oil, palm kernel oil, cacao butter, sal butter, shea butter, and algae oil; animal-derived fat or oil, such as fish oil, seal oil, whale oil, lard, beef tallow, and butter fat; and transesterified oils, hydrogenated oils, and fractionated oils thereof. Those may be used alone or in combination thereof.

The fatty acids derived from a fat or oil may be obtained by hydrolyzing a fat or oil. As a method of hydrolyzing the fat or oil, there are given a high-temperature and high-pressure degradation method and an enzymatic degradation method. The high-temperature and high-pressure degradation method is a method involving adding water to a fat or oil, and subjecting the mixture to a reaction under high-temperature and high-pressure conditions, to thereby provide fatty acids and glycerin. In addition, the enzymatic degradation method is a method involving adding water to a fat or oil, and subjecting the mixture to a reaction under a low-temperature condition using a fat or oil hydrolytic enzyme as a catalyst, to thereby provide fatty acids and glycerin.

The hydrolysis reaction may be performed in accordance with a conventional method.

After the hydrolysis of the fat or oil, it is preferred that a hydrolysate be fractionated and a solid be removed. As a fractionation method, there are given a solvent fractionation method, a spontaneous fractionation method (dry fractionation method), and a wetting agent fractionation method.

As means for removing a precipitated solid, there are given, for example, settled separation, filtration, centrifugation, and a method involving mixing fatty acids with an aqueous solution of a wetting agent, followed by separation.

The esterification reaction between the fatty acids derived from a fat or oil, and glycerin is excellent and is preferably performed by an enzymatic method under mild conditions, from the standpoint of, for example, taste and flavor.

The usage amount of the enzyme may be appropriately decided in consideration of the activity of the enzyme. From the standpoint of increasing a reaction rate, when an immobilized enzyme is used, the usage amount is preferably from 1% to 30%, more preferably from 2% to 20%, with respect to the total mass of raw materials for the esterification reaction.

The reaction temperature of the esterification reaction is preferably from 0° ° C. to 100° C., more preferably from 20° C. to 80° C., even more preferably from 30° C. to 60° C., from the standpoint of increasing a reaction rate and the standpoint of suppressing the inactivation of the enzyme. In addition, a reaction time is preferably 15 hours or less, more preferably from 1 hour to 12 hours, even more preferably from 2 hours to 10 hours, from the standpoint of the industrial productivity of the fat or oil.

As means for bringing the fatty acids and glycerin into contact with each other, there are given, for example, immersion, stirring, and a method involving passing a liquid through a column packed with an immobilized lipase through use of a pump or the like.

After the esterification reaction, a refinement process to be generally used for a fat or oil may be performed. Specific examples thereof may include processes, such as distillation treatment, acid treatment, water washing, decoloration, and deodorization.

As shown in Examples to be described later, in the fat or oil composition of the present invention, eicosapentaenoic acid in the fat or oil is vulnerable to hydrolysis by pancreatic lipase, whereas the hydrolysis of the saturated fatty acids thereby is suppressed, resulting in more eicosapentaenoic acid freed from the fat or oil, and less saturated fatty acids freed therefrom.

In the fat or oil composition of the present invention, the ratio (free EPA/free SFA) of the amount of free eicosapentaenoic acid produced in an in vitro digestion model test described in Examples to the amount of free saturated fatty acids produced therein is preferably 1.2 or more, more preferably 1.5 or more, more preferably 1.8 or more, even more preferably 2.5 or more.

The fat or oil composition of the present invention may be used in the same manner as a general edible fat or oil, and may be applied to various foods and drinks and feeds each using a fat or oil. Examples of the food and drink include foods for specified health use and foods with function claims claiming to have the physiological effects of eicosapentaenoic acid and diacylglycerols as well as general foods and drinks.

The form of the food and drink may be a solid, a semisolid, or a liquid, and examples thereof include a drink, a water-in-oil type fat or oil-containing food, an oil-in-water type fat or oil-containing food, a bakery food, confectionery, a frozen food, a retort food, and a composition for nutritional supplementation, such as a tablet, a capsule, or a troche.

Examples of the feed include: a livestock feed to be used for cattle, swine, or the like; a small-animal feed to be used for rabbits, mice, or the like; a fish and shellfish feed to be used for eels, prawns, or the like; and a pet food to be used for dogs, cats, or the like.

From the standpoint of increasing the amount of eicosapentaenoic acid freed from the fat or oil, and reducing the amount of the saturated fatty acids freed therefrom, and the standpoint of physiological effects, the fat or oil composition of the present invention is preferably a fat or oil composition comprising a fat or oil, in which the content of diacylglycerols in the fat or oil is from 60 mass % to 100 masse, the content of eicosapentaenoic acid in constituent fatty acids of the diacylglycerols is from 18 mass % to 99 mass %, and the content (X) of the diacylglycerols and the content (Y) of eicosapentaenoic acid satisfy a relationship of the following expression (3):

$$X \times 0.6 + Y > 65 \quad (3)$$

where X represents the content (mass %) of the diacylglycerols in the fat or oil, and Y represents the content (mass %) of eicosapentaenoic acid in the constituent fatty acids of the diacylglycerols.

From the standpoint of increasing the amount of eicosapentaenoic acid freed from the fat or oil, and reducing the amount of the saturated fatty acids freed therefrom, and the standpoint of physiological effects, the fat or oil composition of the present invention is preferably a fat or oil composition comprising a fat or oil, in which the content of diacylglycerols in the fat or oil is from 60 mass % to 100 mass % and the content of eicosapentaenoic acid in constituent fatty acids of the diacylglycerols is from 18 mass % to 99 mass %, in which the content (X) of the diacylglycerols and the content (Y) of eicosapentaenoic acid satisfy a relationship of the following expression (3):

$$X \times 0.6 + Y > 65 \quad (3)$$

where X represents the content (mass %) of the diacylglycerols in the fat or oil, and Y represents the content (mass %) of eicosapentaenoic acid in the constituent fatty acids of the diacylglycerols, and the total content of saturated fatty acids in the constituent fatty acids of the fat or oil is from 0.5 mass % to 10 mass %.

From the standpoint of increasing the amount of eicosapentaenoic acid freed from the fat or oil, and reducing the amount of the saturated fatty acids freed therefrom, the standpoint of physiological effects, and the standpoint of the industrial productivity of the fat or oil, the fat or oil composition of the present invention is preferably a fat or oil composition comprising a fat or oil, in which the content of diacylglycerols in the fat or oil is from 60 mass % to 100 mass %, the content of unsaturated fatty acids in constituent fatty acids of the diacylglycerols is from 80 mass % to 100 mass % and the content of eicosapentaenoic acid in the constituent fatty acids of the diacylglycerols is from 18 mass % to 99 mass %, in which the content (X) of the diacylglycerols and the content (Y) of eicosapentaenoic acid satisfy a relationship of the following expression (3):

$$X \times 0.6 + Y > 65 \quad (3)$$

where X represents the content (mass %) of the diacylglycerols in the fat or oil, and Y represents the content (mass %) of eicosapentaenoic acid in the constituent fatty acids of the diacylglycerols.

From the standpoint of increasing the amount of eicosapentaenoic acid freed from the fat or oil, and reducing the amount of the saturated fatty acids freed therefrom, the standpoint of physiological effects, and the standpoint of the industrial productivity of the fat or oil, the fat or oil composition of the present invention is preferably a fat or oil composition comprising a fat or oil, in which the content of diacylglycerols in the fat or oil is from 60 mass % to 100 mass %, the content of monoacylglycerols in the fat or oil is from 0.1 mass % to 10 mass % and the content of eicosapentaenoic acid in constituent fatty acids of the diacylglycerols is from 18 mass % to 99 mass %, in which the content (X) of the diacylglycerols and the content (Y) of eicosapentaenoic acid satisfy a relationship of the following expression (3):

$$X \times 0.6 + Y > 65 \quad (3)$$

where X represents the content (mass %) of the diacylglycerols in the fat or oil, and Y represents the content (mass %) of eicosapentaenoic acid in the constituent fatty acids of the diacylglycerols.

From the standpoint of increasing the amount of eicosapentaenoic acid freed from the fat or oil, and reducing the amount of the saturated fatty acids freed therefrom, and the standpoint of physiological effects, the fat or oil composition of the present invention is preferably a fat or oil composition comprising a fat or oil, in which the content of diacylglycerols in the fat or oil is from 70 mass % to 99.5 mass % and the content of eicosapentaenoic acid in the constituent fatty acids of the diacylglycerols is from 45 mass % to 99 mass %, in which the content (X) of the diacylglycerols and the content (Y) of eicosapentaenoic acid satisfy a relationship of the following expression (6):

$$X\times 0.6+Y>80 \quad (6)$$

where X represents the content (mass %) of the diacylglycerols in the fat or oil, and Y represents the content (mass %) of eicosapentaenoic acid in the constituent fatty acids of the diacylglycerols.

From the standpoint of increasing the amount of eicosapentaenoic acid freed from the fat or oil, and reducing the amount of the saturated fatty acids freed therefrom, and the standpoint of physiological effects, the fat or oil composition of the present invention is preferably a fat or oil composition comprising a fat or oil, in which the content of diacylglycerols in the fat or oil is from 70 mass % to 99.5 mass % and the content of eicosapentaenoic acid in constituent fatty acids of the diacylglycerols is from 45 mass % to 99 mass %, in which the content (X) of the diacylglycerols and the content (Y) of eicosapentaenoic acid satisfy a relationship of the following expression (6):

$$X\times 0.6+Y>80 \quad (6)$$

where X represents the content (mass %) of the diacylglycerols in the fat or oil, and Y represents the content (mass %) of eicosapentaenoic acid in the constituent fatty acids of the diacylglycerols, and the total content of saturated fatty acids in the constituent fatty acids of the fat or oil is from 0.5 mass % to 10 mass %.

From the standpoint of increasing the amount of eicosapentaenoic acid freed from the fat or oil, and reducing the amount of the saturated fatty acids freed therefrom, the standpoint of physiological effects, and the standpoint of the industrial productivity of the fat or oil, the fat or oil composition of the present invention is preferably a fat or oil composition comprising a fat or oil, in which the content of diacylglycerols in the fat or oil is from 70 mass % to 99.5 mass %, the content of monoacylglycerols in the fat or oil is from 0.1 mass % to 10 mass % and the content of eicosapentaenoic acid in constituent fatty acids of the diacylglycerols is from 45 mass % to 99 mass %, in which the content (X) of the diacylglycerols and the content (Y) of eicosapentaenoic acid satisfy a relationship of the following expression (6):

$$X\times 0.6+Y>80 \quad (6)$$

where X represents the content (mass %) of the diacylglycerols in the fat or oil, and Y represents the content (mass %) of eicosapentaenoic acid in the constituent fatty acids of the diacylglycerols.

In relation to the above-mentioned embodiments, the present invention further discloses the following fat or oil compositions.

<1> A fat or oil composition, comprising a fat or oil, wherein the content of diacylglycerols in the fat or oil is from 60 mass % to 100 mass % and the content of eicosapentaenoic acid in constituent fatty acids of the diacylglycerols is from 15 mass % to 99 mass %, wherein the content (X) of the diacylglycerols and the content (Y) of eicosapentaenoic acid satisfy a relationship of the following expression (1):

$$X\times 0.6+Y>60 \quad (1)$$

where X represents the content (mass %) of the diacylglycerols in the fat or oil, and Y represents the content (mass %) of eicosapentaenoic acid in the constituent fatty acids of the diacylglycerols.

<2> The fat or oil composition according to Item <1>, wherein the content of the fat or oil in the fat or oil composition is preferably 90 mass& or more, more preferably 95 mass % or more, is preferably 100 mass % or less, more preferably 99.9 mass % or less, and is preferably from 90 mass % to 100 mass %, more preferably from 95 mass % to 99.9 mass %.

<3> The fat or oil composition according to Item <1> or <2>, wherein the content of the diacylglycerols in the fat or oil is 60 mass % or more, preferably 70 mass % or more, more preferably 80 mass % or more, is 100 mass % or less, preferably 99.5 mass % or less, more preferably 98 mass % or less, more preferably 95 mass % or less, even more preferably 90 mass % or less, and is from 60 mass % to 100 mass %, preferably from 60 mass % to 99.5 mass %, more preferably from 60 mass % to 98 mass %, more preferably from 70 mass % to 95 mass %, more preferably from 70 mass % to 90 mass %, even more preferably from 80 mass % to 90 mass %.

<4> The fat or oil composition according to any one of Items <1> to <3>, wherein the content of eicosapentaenoic acid in the constituent fatty acids of the diacylglycerols is 15 mass % or more, preferably 18 mass % or more, more preferably 20 mass % or more, more preferably 25 mass % or more, more preferably 30 mass % or more, more preferably 40 mass % or more, even more preferably 45 mass % or more, and is 99 mass % or less, preferably 98 mass % or less, more preferably 95 mass % or less, and is from 15 mass % to 99 mass %, preferably from 18 mass % to 99 mass %, more preferably from 20 mass % to 99 mass %, more preferably from 25 mass % to 99 mass %, more preferably from 30 mass % to 99 mass %, more preferably from 40 mass % to 98 mass %, more preferably from 45 mass % to 98 mass %, even more preferably from 45 mass % to 95 mass %.

<5> The fat or oil composition according to any one of Items <1> to <4>, wherein the content of unsaturated fatty acids in the constituent fatty acids of the diacylglycerols is preferably from 60 mass % to 100 mass %, more preferably from 70 mass % to 99.8 mass %, even more preferably from 80 mass % to 99.5 mass %.

<6> The fat or oil composition according to any one of Items <1> to <5>, wherein a content of linoleic acid in the constituent fatty acids of the diacylglycerols is preferably 0.4 mass % or more, more preferably 0.5 mass % or more, more preferably 1 mass& or more, even more preferably 1.5 mass % or more, is preferably 30 mass % or less, more preferably 20 mass % or less, even more preferably 10 mass % or less, and is preferably from 0.4 mass % to 30 mass %, more preferably from 0.5 mass % to 30 mass %, more preferably from 1 mass % to 20 mass %, even more preferably from 1.5 mass % to 10 mass %.

<7> The fat or oil composition according to any one of Items <1> to <6>, wherein a content of oleic acid in the constituent fatty acids of the diacylglycerols is preferably 1 mass % or more, more preferably 5 mass % or more, more preferably 7 mass % or more, even more preferably 10 mass % or more, is preferably 30 mass % or less, more preferably 25 mass % or less, even more preferably 20 mass % or less, and is preferably from 1 mass % to 30 mass %, more preferably from 5 mass % to 30 mass %, more preferably from 7 mass % to 25 mass %, even more preferably from 10 mass % to 20 mass %.

<8> The fat or oil composition according to any one of Items <1> to <7>, wherein a content of docosahexaenoic acid in the constituent fatty acids of the diacylglycerols is preferably 0.3 mass % or more, more preferably 3 mass % or more, more preferably 4 mass % or more, even more preferably 5 mass % or more, is preferably 40 mass % or less, more preferably 30 mass % or less, more preferably 25 mass % or less, even more preferably 20 mass % or less, and is preferably from 0.3 mass % to 40 mass %, more preferably from 3 mass % to 40 mass %, more preferably from 4 mass % to 30 mass %, more preferably from 5 mass % to 25 mass %, even more preferably from 5 mass % to 20 mass %.

<9> The fat or oil composition according to any one of Items <1> to <8>, wherein a total content of saturated fatty acids in the constituent fatty acids of the diacylglycerols is preferably 15 mass % or less, more preferably 12 mass % or less, even more preferably 10 mass % or less, is preferably 0.5 mass % or more, and is preferably from 0 mass % to 15 mass %, more preferably from 0.5 mass % to 12 mass %, even more preferably from 0.5 mass % to 10 mass %.

<10> The fat or oil composition according to any one of Items <1> to <9>, wherein the content (X) of the diacylglycerols and the content (Y) of eicosapentaenoic acid preferably satisfy a relationship of the following expression (2), more preferably satisfy a relationship of the following expression (3), more preferably satisfy a relationship of the following expression (4), more preferably satisfy a relationship of the following expression (5), and even more preferably satisfy a relationship of the following expression (6):

$$X \times 0.6 + Y > 62 \quad (2)$$

$$X \times 0.6 + Y > 65 \quad (3)$$

$$X \times 0.6 + Y > 70 \quad (4)$$

$$X \times 0.6 + Y > 75 \quad (5)$$

$$X \times 0.6 + Y > 80 \quad (6)$$

where X and Y each have the same meaning as in the foregoing.

<11> The fat or oil composition according to any one of Items <1> to <10>, wherein a content of triacylglycerols in the fat or oil is preferably 1 mass % or more, more preferably 2 mass % or more, more preferably 5 mass % or more, even more preferably 10 mass % or more, is preferably 35 mass % or less, more preferably 30 mass % or less, more preferably 25 mass % or less, even more preferably 20 mass % or less, and is preferably from 1 mass % to 35 mass %, more preferably from 2 mass % to 30 mass %, more preferably from 5 mass % to 25 mass %, even more preferably from 10 mass % to 20 mass %.

<12> The fat or oil composition according to any one of Items <1> to <11>, wherein a content of monoacylglycerols in the fat or oil is preferably 15 mass& or less, more preferably 10 mass % or less, more preferably 5 mass % or less, more preferably 3 mass % or less, more preferably 2 mass % or less, even more preferably 1.5 mass % or less, is preferably more than 0 mass %, more preferably 0.1 mass % or more, and is preferably from 0 mass % to 15 mass %, more preferably from 0 mass % to 10 mass %, more preferably from 0 mass % to 5 mass %, more preferably from 0.1 mass % to 3 mass %, more preferably from 0.1 mass % to 2 mass %, even more preferably from 0.1 mass % to 1.5 mass %.

<13> The fat or oil composition according to any one of Items <1> to <12>, wherein a content of a free fatty acid or a salt thereof in the fat or oil is preferably 3 mass % or less, more preferably 2 mass % or less, even more preferably 1 mass % or less, and is preferably more than 0 mass %.

<14> The fat or oil composition according to any one of Items <1> to <13>, wherein the content of eicosapentaenoic acid in the constituent fatty acids of the fat or oil is preferably from 15 mass % to 99 mass %, more preferably from 15 mass % to 98 mass %, more preferably from 18 mass % to 98 mass %, more preferably from 20 mass % to 98 mass %, more preferably from 25 mass % to 97 mass %, more preferably from 30 mass % to 95 mass %, more preferably from 40 mass % to 95 mass %, more preferably from 45 mass % to 95 mass %, even more preferably from 45 mass % to 90 mass %.

<15> The fat or oil composition according to any one of Items <1> to <14>, wherein a content of unsaturated fatty acids in the constituent fatty acids of the fat or oil is preferably from 60 mass % to 100 mass %, more preferably from 70 mass % to 99.8 mass %, even more preferably from 80 mass % to 99.5 mass %.

<16> The fat or oil composition according to any one of Items <1> to <15>, wherein the total content of saturated fatty acids in the constituent fatty acids of the fat or oil is preferably 15 mass % or less, more preferably 12 mass % or less, even more preferably 10 mass % or less, is preferably 0.5 mass % or more, and is preferably from 0 mass % to 15 mass %, more preferably from 0.5 mass % to 12 mass %, even more preferably from 0.5 mass % to 10 mass %.

<17> The fat or oil composition according to any one of Items <1> to <16>, further comprising an antioxidant.

<18> The fat or oil composition according to any one of Items <1> to <17>, wherein the fat or oil composition preferably comprises an oil obtained through an esterification reaction between fractionated fatty acids derived from a fat or oil, and glycerin.

<19> The fat or oil composition according to Item <18>, wherein the fractionated fatty acids are preferably derived from at least one kind of fat or oil selected from the group consisting of algae oil, fish oil, seal oil, and whale oil.

<20> A food and drink, comprising the fat or oil composition of any one of Items <1> to <19>.

<21> A feed, comprising the fat or oil composition of any one of Items <1> to <19>.

EXAMPLES

[Analysis Methods]

(i) Glyceride Composition of Fat or Oil

A fat or oil was dissolved at 1 mg/ml using a chloroform/methanol (1/9) mixed solvent, and the solution was diluted 10-fold with methanol, followed by analysis through high-performance liquid chromatography (HPLC) with standard samples for calibration.

<Standard Samples>

(1) For diacylglycerols: triolein/diolein/monoolein=5/80/15 (weight ratio)

(2) For triacylglycerols: triolein/diolein/monoolein=90/5/5 (weight ratio)

<HPLC Analysis Conditions>

(Conditions)

Apparatus: UHPLC (manufactured by Thermo Fisher Scientific Inc.)

Column: L-column C8 (2.1 mm×35 mm×5 μm) (manufactured by the Chemicals Evaluation and Research Institute, Japan)

<GLC Analysis Conditions>

Apparatus: Agilent 7890B (manufactured by Agilent Technologies)

Column: CP-SIL88 50 m×0.25 mm×0.2 μm (manufactured by Agilent J&W) Carrier gas: 1.0 mL He/min Injector: Split (1:50), T=300° C.

Detector: FID, T=300° ° C.

Oven temperature: kept at 150° ° C. for 5 min=> increased at 1° C./min=> kept at 160° ° C. for 5 min=> increased at 2° ° C./min=> kept at 200° C. for 10 min=> increased at 10° C./min-kept at 220° ° C. for 5 min

Examples 1 to 8 and Comparative Examples 1 to 5

[Preparation of Fat or Oil Compositions]

(1) Fat or oil "a" to a fat or oil "j" shown in Table 2 were prepared.

TABLE 2

| | | Fat or oil "a" | Fat or oil "b" | Fat or oil "c" | Fat or oil "d" | Fat or oil "e" | Fat or oil "f" | Fat or oil "g" | Fat or oil "h" | Fat or oil "i" | Fat or oil "j" |
|---|---|---|---|---|---|---|---|---|---|---|---|
| Glyceride composition (%) | Free fatty acids | 0.1 | 0.5 | 0.1 | 0.5 | 0.5 | 0.1 | 1.3 | 0.2 | 0.2 | 0.0 |
| | MAG | 1.6 | 0.5 | 0.5 | 0.1 | 0.4 | 0.4 | 1.8 | 0.0 | 0.0 | 0.1 |
| | DAG | 96.9 | 73.9 | 87.1 | 2.8 | 23.3 | 1.8 | 96.9 | 0.0 | 0.0 | 0.7 |
| | TAG | 1.4 | 25.1 | 12.3 | 96.6 | 75.8 | 97.7 | 0.0 | 99.8 | 99.8 | 99.2 |
| Fatty acid composition of whole fat or oil (%) | Myristic acid | 0.3 | 0.2 | 0.0 | 0.3 | 0.2 | 0.0 | 0.0 | 4.6 | 1.3 | 2.0 |
| | Palmitic acid | 1.2 | 0.9 | 2.8 | 1.0 | 0.8 | 3.9 | 0.1 | 6.0 | 19.9 | 25.9 |
| | Stearic acid | 5.2 | 4.0 | 1.0 | 4.3 | 3.7 | 1.7 | 0.0 | 0.5 | 1.6 | 13.8 |
| | Oleic acid | 17.0 | 13.6 | 37.4 | 15.2 | 12.6 | 57.9 | 1.0 | 7.8 | 8.2 | 38.6 |
| | Linoleic acid | 1.7 | 1.5 | 48.5 | 1.6 | 1.3 | 18.9 | 0.4 | 1.1 | 0.8 | 3.4 |
| | Linolenic acid | 1.9 | 1.9 | 7.9 | 2.0 | 1.8 | 10.3 | 0.9 | 0.8 | 0.0 | 0.4 |
| | Eicosapentaenoic acid | 47.0 | 48.0 | 0.0 | 47.0 | 45.1 | 0.0 | 96.1 | 28.0 | 19.0 | 0.0 |
| | Docosahexaenoic acid | 6.1 | 7.7 | 0.0 | 9.2 | 12.6 | 0.0 | 0.0 | 12.0 | 37.5 | 0.0 |
| | Others | 19.7 | 22.2 | 2.4 | 19.4 | 21.8 | 7.3 | 1.5 | 39.2 | 11.7 | 16.0 |

MAG: Monoacylglycerols
DAG: Diacylglycerols
TAG: Triacylglycerols

Column temperature: 40° C.

Sample injection volume: 10 μL

Flow rate: 0.5 mL/min

Mobile phase: (A) water/acetonitrile=9/1, (B) isopropanol

TABLE 1

(Gradient Table)

| min | A [%] | B [%] |
|---|---|---|
| 0 | 100 | 0 |
| 1 | 50 | 50 |
| 8 | 0 | 100 |
| 10 | 0 | 100 |
| 10.1 | 100 | 0 |
| 15 | 100 | 0 |

Detector: Charged Aerosol Detector (CAD)

(ii) Composition of Constituent Fatty Acids of Fat or Oil

Fatty acid methyl esters were prepared in accordance with "Preparation method for fatty acid methyl ester (2.4.1.-1996)" described in "Standard Method for the Analysis of Fats, Oils and Related Materials" edited by Japan Oil Chemists' Society, and the resultant fat or oil samples were subjected to measurement in conformity with American Oil Chemists. Society Official Method Ce 1f-96 (GLC method).

Fat or oil "a": 100 Parts by mass of fatty acids, which had been obtained by hydrolyzing EPA-45RTG oil (manufactured by Nippon Suisan Kaisha, Ltd.) with an enzyme, and 50 parts by mass of glycerin were mixed and the mixture was subjected to an esterification reaction using a 1,3-selective lipase immobilized on an ion-exchange resin (manufactured by Novozymes) as a catalyst, and then the immobilized enzyme was separated by filtration. After that, diacylglycerols were fractionated by silica gel column chromatography to provide a fat or oil "a".

Fat or oil "b": The product after the completion of the esterification reaction in the production of the fat or oil "a" was molecularly distilled, followed by acid treatment and water washing to provide a treated oil. The treated oil was deodorized to provide a fat or oil "b".

Fat or oil "c": 455 Parts by mass of fatty acids, which had been obtained by hydrolyzing soybean oil with an enzyme, 195 parts by mass of fatty acids, which had been obtained by hydrolyzing rapeseed oil with an enzyme, and 107 parts by mass of glycerin were mixed and the mixture was subjected to an esterification reaction using a 1,3-selective lipase immobilized on an ion-exchange resin (manufactured by Novozymes) as a catalyst. After the immobilized enzyme had been separated by filtration, acid treatment and water washing were performed to provide a treated oil. The treated oil was deodorized to provide a fat or oil "c".

Fat or oil "d": Triacylglycerols were fractionated in the silica gel column chromatography purification in the production of the fat or oil "a" to provide a fat or oil "d".

Fat or oil "e": EPA-45RTG oil (manufactured by Nippon Suisan Kaisha, Ltd.) was used.

Fat or oil "f": Rapeseed oil (manufactured by The Nisshin OilliO Group, Ltd.) was used.

Fat or oil "g": 100 Parts by mass of EPA (manufactured by Combi-Blocks Inc.) and 50 parts by mass of glycerin were mixed in a hexane solvent, and the mixture was subjected to an esterification reaction using a 1,3-selective lipase immobilized on an ion-exchange resin (manufactured by Novozymes) as a catalyst, and then the immobilized enzyme was separated by filtration. After that, diacylglycerols were fractionated by silica gel column chromatography to provide a fat or oil "g".

Fat or oil "h": DD Oil Type 2 (manufactured by Nippon Suisan Kaisha, Ltd.) was used.

Fat or oil i: Life's Omega 60 (manufactured by DSM) was used.

Fat or oil "j": Refined lard was used. This fat or oil is used for the purpose of incorporating a certain amount or more of saturated fatty acids into the fat or oil "g", and hence may be substituted by general lard.

(2) The fat or oil "a" to the fat or oil "j" were mixed at ratios shown in Table 3 to provide fat or oil compositions. The glyceride composition and fatty acid composition of each of the fat or oil compositions are shown in Table 3.

TABLE 3

| | | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 |
|---|---|---|---|---|---|---|---|---|---|---|---|---|---|---|
| Mixing ratio of fat or oil (g/100 g) | Fat or oil "a" | 0 | 0 | 0 | 0 | 0 | 100 | 0 | 0 | 0 | 0 | 0 | 0 | 0 |
| | Fat or oil "b" | 63 | 28 | 31 | 65 | 100 | 0 | 0 | 0 | 0 | 0 | 60 | 18 | 0 |
| | Fat or oil "c" | 12 | 38 | 59 | 35 | 0 | 0 | 0 | 0 | 0 | 0 | 0 | 82 | 62 |
| | Fat or oil "d" | 0 | 0 | 0 | 0 | 0 | 0 | 0 | 0 | 100 | 0 | 0 | 0 | 0 |
| | Fat or oil "e" | 25 | 34 | 10 | 0 | 0 | 0 | 0 | 0 | 0 | 70 | 0 | 0 | 33 |
| | Fat or oil "f" | 0 | 0 | 0 | 0 | 0 | 0 | 0 | 0 | 0 | 30 | 40 | 0 | 5 |
| | Fat or oil "g" | 0 | 0 | 0 | 0 | 0 | 0 | 70 | 88 | 0 | 0 | 0 | 0 | 0 |
| | Fat or oil "h" | 0 | 0 | 0 | 0 | 0 | 0 | 20 | 0 | 0 | 0 | 0 | 0 | 0 |
| | Fat or oil "i" | 0 | 0 | 0 | 0 | 0 | 0 | 10 | 0 | 0 | 0 | 0 | 0 | C |
| | Fat or oil "j" | 0 | 0 | 0 | 0 | 0 | 0 | 0 | 12 | 0 | 0 | 0 | 0 | 0 |
| Glyceride composition (%) | Free fatty acids | 0.4 | 0.3 | 0.3 | 0.3 | 0.5 | 0.1 | 1.1 | 1.2 | 0.5 | 0.4 | 0.3 | 0.2 | 0.2 |
| | MAG | 0.5 | 0.5 | 0.5 | 0.5 | 0.5 | 1.6 | 1.3 | 1.6 | 0.1 | 0.4 | 0.5 | 0.5 | 0.5 |
| | DAG | 62.8 | 61.7 | 76.6 | 78.5 | 73.9 | 96.9 | 67.8 | 85.4 | 2.8 | 16.9 | 45.1 | 84.7 | 61.8 |
| | TAG | 36.2 | 37.5 | 22.6 | 20.6 | 25.1 | 1.4 | 29.9 | 11.9 | 96.6 | 82.4 | 54.1 | 14.6 | 37.5 |
| Fatty acid composition in fat or oil (%) | Myristic acid | 0.2 | 0.2 | 0.1 | 0.2 | 0.2 | 0.3 | 1.0 | 0.2 | 0.3 | 0.2 | 0.1 | 0.1 | 0.1 |
| | Palmitic acid | 1.1 | 1.6 | 2.0 | 1.6 | 0.9 | 1.2 | 3.3 | 3.2 | 1.0 | 1.7 | 2.1 | 2.4 | 2.2 |
| | Stearic acid | 3.6 | 2.8 | 2.2 | 3.0 | 4.0 | 5.2 | 0.3 | 1.7 | 4.3 | 3.1 | 3.1 | 1.6 | 2.0 |
| | Oleic acid | 16.2 | 22.3 | 27.5 | 21.9 | 13.6 | 17.0 | 3.1 | 5.5 | 15.2 | 26.2 | 31.3 | 33.1 | 30.2 |
| | Linoleic acid | 7.1 | 19.3 | 29.2 | 17.9 | 1.5 | 1.7 | 0.6 | 0.7 | 1.6 | 6.6 | 8.5 | 40.0 | 31.4 |
| | Linolenic acid | 2.6 | 4.2 | 5.4 | 4.0 | 1.9 | 1.9 | 0.8 | 0.8 | 2.0 | 4.4 | 5.3 | 6.8 | 6.0 |
| | Eicosapentaenoic acid | 41.2 | 28.6 | 19.3 | 30.9 | 47.6 | 47.2 | 74.8 | 84.6 | 47.1 | 31.5 | 28.6 | 8.6 | 14.9 |
| | Docosahexaenoic acid | 8.0 | 6.4 | 3.6 | 5.0 | 7.7 | 6.1 | 6.2 | 0.0 | 9.2 | 8.8 | 4.6 | 1.4 | 4.2 |
| | Others | 20.0 | 14.7 | 10.6 | 15.5 | 22.6 | 19.5 | 10.1 | 3.3 | 19.3 | 17.5 | 16.4 | 6.1 | 9.1 |
| Fatty acid composition in DAG (%) | Myristic acid | 0.4 | 0.3 | 0.2 | 0.2 | 0.3 | 0.1 | 0.2 | 0.1 | 1.0 | 0.4 | 0.2 | 0.1 | 0.2 |
| | Palmitic acid | 1.2 | 1.7 | 2.1 | 1.6 | 0.9 | 1.1 | 0.5 | 0.4 | 1.9 | 2.1 | 2.4 | 2.6 | 2.4 |
| | Stearic acid | 3.9 | 3.0 | 2.4 | 3.2 | 4.3 | 3.2 | 0.2 | 0.2 | 4.1 | 3.6 | 3.6 | 1.7 | 2.2 |
| | Oleic acid | 15.5 | 22.3 | 27.4 | 21.0 | 12.0 | 16.9 | 1.1 | 1.3 | 12.8 | 27.2 | 30.9 | 33.2 | 30.9 |
| | Linoleic acid | 7.0 | 19.0 | 28.9 | 17.8 | 1.5 | 2.4 | 0.4 | 0.5 | 1.5 | 7.5 | 9.7 | 39.6 | 31.2 |
| | Linolenic acid | 2.1 | 3.9 | 5.4 | 3.8 | 1.3 | 2.4 | 0.8 | 0.9 | 0.9 | 4.3 | 5.4 | 7.0 | 6.1 |
| | Eicosapentaenoic acid | 42.0 | 29.3 | 19.6 | 31.3 | 48.2 | 45.3 | 94.1 | 94.8 | 42.4 | 32.6 | 28.9 | 8.7 | 15.3 |
| | Docosahexaenoic acid | 7.6 | 6.1 | 3.5 | 4.8 | 7.3 | 6.1 | 0.4 | 0.0 | 7.9 | 8.4 | 4.4 | 1.3 | 4.0 |
| | Others | 20.4 | 14.2 | 10.5 | 16.3 | 24.2 | 22.4 | 2.3 | 1.6 | 27.3 | 13.9 | 14.5 | 5.8 | 7.6 |

MAG: Monoacylglycerols
DAG: Diacylglycerols
TAG: Triacylglycerols

[In Vitro Digestion Model Test]

10 mg of each of the fat or oil compositions prepared in the foregoing was placed in a 25 mL centrifuge tube, and 3 mL of a bile acid solution obtained by dissolving 180 mg of $CaCl_2 \cdot 2H_2O$ (manufactured by Sigma-Aldrich) and 10 mg of 0.01% sodium taurocholate (manufactured by Kanto Chemical Co., Inc.) in 100 ml of a 0.5 M Tris-HCl buffer (pH 7.7) was added, followed by temperature adjustment to 34° C. After it had been recognized that the temperature had reached 34° C., the mixture was ultrasonically homogenized for 2 minutes to prepare bile acid micelles. To the bile acid micelles, 6 µg of colipase (manufactured by Sigma-Aldrich, Colipase from porcine pancreas, essentially salt-free, lyophilized powder) and 2,000 U of lipase from porcine pancreas (manufactured by Sigma-Aldrich, Lipase from porcine pancreas, Type VI-S, >=20,000 units/mg protein, lyophilized powder) were added, and the mixture was stirred and then dispensed in aliquots of 500 µL into test tubes. The test tubes were shaken in a thermostatic bath at 37° C., and then, 20 minutes later, 100 µL of 0.5 M HCl was added to stop reaction. 5 mL of a chloroform/methanol (2/1) mixed solvent was added, and the mixture was stirred. After that, 1 mL of distilled water was added, and the mixture was stirred again. Centrifugation at 3,000 rpm/min and 25° C. for 5 minutes was performed twice, and then the methanol layer was removed and the organic layer was brought to dryness to provide digested lipids.

The resultant digested lipids were dissolved in chloroform, and the solution was applied onto an HPTLC glass plate (silica gel 60, manufactured by Merck) and then developed with a developing solvent (chloroform/acetone/acetic acid=95/5/0.5) to be fractionated. Only a scraped free fatty acid fraction was placed in a test tube into which 250 µg of C21:0-TAG (manufactured by Larodan) had been added in advance. 3 mL of a 0.5 M NaOH/MeOH solution was added, and the mixture was stirred, followed by heating at 80° C. for 5 minutes. After that, a 14% BF3·MeOH solution (manufactured by Sigma-Aldrich) was added, and the mixture was further heated at 80° C. for 2 minutes to perform methyl esterification. Then, 2 mL of brine and 1 mL of hexane were added, the mixture was stirred and then centrifuged at 3,000 r/min for 1 minute, and only the hexane layer was separated. After that, 1 mL of hexane was further added, a similar operation was performed, and the hexane layers were combined. After having been passed through a dehydration column of sodium sulfate, the fatty acid composition was analyzed by the above-mentioned method to determine the amount of eicosapentaenoic acid freed from the fat or oil composition and the amount of saturated fatty acids freed therefrom.

The results are shown in Table 4.

TABLE 4

| | | Example 1 | Example 2 | Example 3 | Example 4 | Example 5 | Example 6 | Example 7 | Example 8 | Comparative Example 1 | Comparative Example 2 | Comparative Example 3 | Comparative Example 4 | Comparative Example 5 |
|---|---|---|---|---|---|---|---|---|---|---|---|---|---|---|
| Glyceride composition (%) | DAG (%) | 62.8 | 61.7 | 76.6 | 78.5 | 73.9 | 96.9 | 67.8 | 85.4 | 2.8 | 16.9 | 45.1 | 84.7 | 61.8 |
| | TAG (%) | 36.2 | 37.5 | 22.6 | 20.6 | 25.1 | 1.4 | 29.9 | 11.9 | 96.6 | 82.4 | 54.1 | 14.6 | 37.5 |
| Fatty acid composition in fat or oil (%) | EPA (%) | 41.2 | 28.6 | 19.3 | 30.9 | 47.6 | 47.2 | 74.8 | 84.6 | 47.1 | 31.5 | 28.6 | 8.6 | 14.9 |
| | SFA (%) | 7.0 | 6.1 | 5.5 | 6.4 | 7.6 | 7.4 | 5.1 | 5.2 | 6.5 | 6.7 | 7.0 | 4.7 | 5.1 |
| Fatty acid composition in DAG (%) | EPA (%) | 42.0 | 29.3 | 19.6 | 31.3 | 48.2 | 45.3 | 94.1 | 94.8 | 42.4 | 32.6 | 28.9 | 8.7 | 15.3 |
| (1) Free EPA after digestion reaction (µg/mg oil) | | 36.6 | 32.4 | 19.9 | 29.8 | 37.7 | 36.1 | 56.0 | 55.5 | 37.3 | 36.2 | 36.0 | 10.8 | 19.0 |
| (2) Free SFA after digestion reaction (µg/mg oil) | | 18.6 | 24.9 | 16.5 | 19.0 | 12.5 | 12.5 | 15.8 | 15.4 | 35.6 | 46.3 | 33.3 | 25.7 | 24.9 |
| (1)/(2) [free EPA/free SFA] | | 1.97 | 1.30 | 1.21 | 1.57 | 3.02 | 2.89 | 3.55 | 3.61 | 1.05 | 0.782 | 1.08 | 0.420 | 0.763 |

DAG: Diacylglycerols
TAG: Triacylglycerols
EPA: Eicosapentaenoic acid
SFA: Saturated fatty acids As shown in Table 4, in each of the fat or oil compositions of the present invention, eicosapentaenoic acid in the fat or oil was vulnerable to hydrolysis by pancreatic lipase, but the hydrolysis of the saturated fatty acids thereby was suppressed, resulting in more eicosapentaenoic acid freed from the fat or oil, and less the saturated fatty acids freed therefrom (Examples 1 to 8).

In contrast, in each of the fat or oil compositions containing a large amount of triacylglycerols, even in the case of containing a large amount of eicosapentaenoic acid, the saturated fatty acids in the fat or oil were degraded to a degree equal to or higher than that of eicosapentaenoic acid at the time of hydrolysis by pancreatic lipase, resulting in more saturated fatty acids freed from the fat or oil (Comparative Examples 1 to 3). In addition, even in the case of containing diacylglycerols at a high content of 60% or more, when the content of eicosapentaenoic acid was small, the more saturated fatty acids in the fat or oil were degraded, resulting in a large amount of the freed saturated fatty acid (Comparative Example 4). Also, when the diacylglycerols and eicosapentaenoic acid did not satisfy the certain relationship, a sufficient effect was not found, and the amount of the freed saturated fatty acid was large (Comparative Example 5).

The invention claimed is:

1. A fat or oil composition, comprising a fat or oil, wherein a content of diacylglycerols in the fat or oil is from 60 mass % to 100 mass %, a content of eicosapentaenoic acid in constituent fatty acids of the diacylglycerols is from 15 mass % to 99 mass %, and a content of saturated fatty acids in the constituent fatty acids of the diacylglycerols is from 0.5 mass % to 15 mass %, and a content (X) of the diacylglycerols and a content (Y) of the eicosapentaenoic acid satisfy a relationship of the following expression (1):

$$X \times 0.6 + Y > 60 \quad (1)$$

where X represents the content (mass %) of the diacylglycerols in the fat or oil, and Y represents the content (mass %) of the eicosapentaenoic acid in the constituent fatty acids of the diacylglycerols.

2. The fat or oil composition according to claim 1, wherein a total content of saturated fatty acids in constituent fatty acids of the fat or oil is 15 mass % or less.

3. The fat or oil composition according to claim 1, wherein a content of monoacylglycerols in the fat or oil is 15 mass % or less.

4. The fat or oil composition according to claim 1, wherein a content of saturated fatty acids in the constituent fatty acids of the diacylglycerols is from 0.5 mass % to 12 mass %.

5. The fat or oil composition according to claim 1, wherein a content of saturated fatty acids in the constituent fatty acids of the diacylglycerols is from 0.5 mass % to 10 mass %.

6. The fat or oil composition according to claim 1, wherein a content of eicosapentaenoic acid in constituent fatty acids of the diacylglycerols is from 18% to 99%.

7. The fat or oil composition according to claim 1, wherein a content of eicosapentaenoic acid in constituent fatty acids of the diacylglycerols is from 20% to 99%.

8. The fat or oil composition according to claim 1, wherein a content of eicosapentaenoic acid in constituent fatty acids of the diacylglycerols is from 25% to 99%.

9. The fat or oil composition according to claim 1, wherein a content of eicosapentaenoic acid in constituent fatty acids of the diacylglycerols is from 30% to 99%.

10. The fat or oil composition according to claim 1, wherein a content of eicosapentaenoic acid in constituent fatty acids of the diacylglycerols is from 40% to 98%.

11. The fat or oil composition according to claim 1, wherein a content of eicosapentaenoic acid in constituent fatty acids of the diacylglycerols is from 45% to 98%.

12. The fat or oil composition according to claim 1, wherein a content of eicosapentaenoic acid in constituent fatty acids of the diacylglycerols is from 45% to 95%.

13. The fat or oil composition according to claim 1, wherein a content of docosahexaenoic acid in the constituent fatty acids of the diacylglycerols is from 0.3 mass % to 40 mass %.

14. The fat or oil composition according to claim 1, wherein a content of docosahexaenoic acid in the constituent fatty acids of the diacylglycerols is from 3 mass % to 40 mass %.

15. The fat or oil composition according to claim 1, wherein a content of docosahexaenoic acid in the constituent fatty acids of the diacylglycerols is 4 mass % to 30 mass %.

16. The fat or oil composition according to claim 1, wherein a content of docosahexaenoic acid in the constituent fatty acids of the diacylglycerols is from 5 mass % to 25 mass %.

17. The fat or oil composition according to claim 1, wherein a content of docosahexaenoic acid in the constituent fatty acids of the diacylglycerols is from 5 mass % to 20 mass %.

18. The fat or oil composition according to claim 1, wherein a content of diacylglycerols in the fat or oil is from 60% to 99.5%.

19. The fat or oil composition according to claim 1, wherein a content of diacylglycerols in the fat or oil is from 60% to 98%.

20. The fat or oil composition according to claim 1, wherein a content of diacylglycerols in the fat or oil is from 70% to 95%.

* * * * *